(12) United States Patent
Berezin

(10) Patent No.: US 7,956,912 B2
(45) Date of Patent: *Jun. 7, 2011

(54) ACTIVE PIXEL SENSOR WITH MIXED ANALOG AND DIGITAL SIGNAL INTEGRATION

(75) Inventor: Vladimir Berezin, Pasadena, CA (US)

(73) Assignee: Micron Technology, Inc., Boise, ID (US)

( * ) Notice: Subject to any disclaimer, the term of this patent is extended or adjusted under 35 U.S.C. 154(b) by 682 days.

This patent is subject to a terminal disclaimer.

(21) Appl. No.: 11/529,634

(22) Filed: Sep. 29, 2006

(65) Prior Publication Data

US 2007/0024727 A1  Feb. 1, 2007

Related U.S. Application Data

(63) Continuation of application No. 09/183,389, filed on Oct. 29, 1998, now Pat. No. 7,139,025.

(51) Int. Cl.
*H04N 5/335* (2006.01)
(52) U.S. Cl. .......................... 348/297; 348/308
(58) Field of Classification Search .............. 348/241, 348/308, 297, 298, 302, 316
See application file for complete search history.

(56) References Cited

U.S. PATENT DOCUMENTS

| | | | | |
|---|---|---|---|---|
| 4,191,967 A | * | 3/1980 | Dansac et al. | 348/335 |
| 4,589,079 A | * | 5/1986 | Peter | 348/294 |
| 4,647,976 A | * | 3/1987 | Nakagaki et al. | 348/230.1 |
| 4,710,817 A | | 12/1987 | Ando | |
| 5,168,528 A | * | 12/1992 | Field, Jr. | 348/164 |
| 5,248,971 A | | 9/1993 | Mandi | |
| 5,376,811 A | | 12/1994 | Ikeda | |
| 5,420,629 A | * | 5/1995 | Watanabe | 348/297 |
| 5,665,959 A | | 9/1997 | Fossum et al. | |
| 5,812,703 A | * | 9/1998 | Juen et al. | 348/247 |
| 5,886,659 A | | 3/1999 | Pain et al. | |
| 5,892,541 A | | 4/1999 | Merrill | |
| 5,923,369 A | | 7/1999 | Merrill et al. | |
| 5,982,318 A | * | 11/1999 | Yiannoulos | 348/294 |
| 6,008,486 A | * | 12/1999 | Stam et al. | 348/307 |
| 6,115,065 A | | 9/2000 | Yadid-Pecht et al. | |
| 6,377,303 B2 | | 4/2002 | O'Connor | |
| 6,466,265 B1 | | 10/2002 | Lee et al. | |
| 6,583,817 B1 | | 6/2003 | Lee | |
| 2003/0058345 A1 | | 3/2003 | Morris | |
| 2003/0117520 A1 | | 6/2003 | Fossum et al. | |

* cited by examiner

*Primary Examiner* — Jason Whipkey
(74) *Attorney, Agent, or Firm* — Dickstein Shapiro LLP

(57) ABSTRACT

An active pixel sensor includes mixed analog and digital signal integration on the same substrate. The analog part of the array forms the active pixel sensor, and the digital part of the array does digital integration of the signal.

21 Claims, 2 Drawing Sheets

BLOCK DIAGRAM OF APS WITH MIXED ANALOG AND DIGITAL SIGNAL INTEGRATION

BLOCK DIAGRAM OF APS WITH MIXED
ANALOG AND DIGITAL SIGNAL INTEGRATION

ACTIVE PIXEL SENSOR WITH MIXED ANALOG AND DIGITAL SIGNAL INTEGRATION

The present application is a continuation of application Ser. No. 09/183,389, filed Oct. 29, 1998 now U.S. Pat. No. 7,139,025, the entire disclosure of which is incorporated herein by reference.

BACKGROUND

Active pixel sensors are well known in the art. A basic description of the active pixel sensors found in U.S. Pat. No. 5,471,515, the disclosure of which is incorporated by reference to the extent necessary for proper understanding.

An active pixel sensor, and many other image sensors, have inherent trade-offs. Typically, the trade-off is made between sensitivity, versus motion resolution, versus space resolution.

For example, we obtain sensitivity by increasing the integration time. However, with a higher integration time, motion becomes more choppy, and hence motion sensitivity is decreased. Sensitivity can also be increased by increasing the pixel size. However, space resolution then decreases, again supporting the trade-off.

Integrated circuit designers continually attempt to put more circuitry on a chip. Lines on the chip are becoming smaller: for example, current technology may use a 0.11 micron process for digital circuitry. However, the image sensor, which is effectively analog, may be subject to a physical minimum size. A pixels that has too small a size and/or high gain, would have insufficient capacitance to allow the sensor to obtain the signal to noise ratio required for quality image acquisition.

SUMMARY

The inventor recognized that memory size can form an effective tradeoff against pixel size. The present specification describes receiving information in an analog photosensor array, and integrating that information in on-chip digital memory. According to this system, an analog array is placed on the same substrate with a digital memory. The information from the analog array is sampled periodically, and the integration is carried out in the digital memory.

DESCRIPTION OF THE PREFERRED EMBODIMENTS

Figure 1:
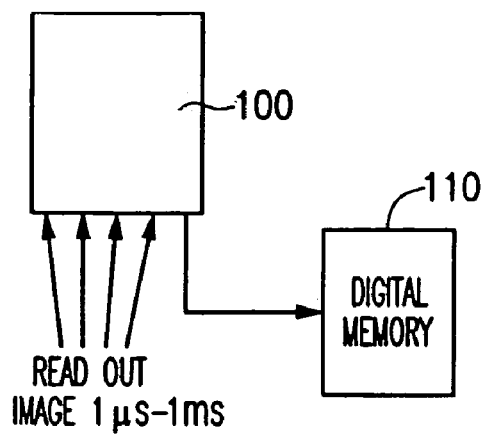
FIG. 1 shows a basic block diagram.

The basic system is shown in FIG. 1. An analog image detector 100, preferably a CMOS image sensor, reads out the image at some time period, e.g., between 1 microsecond and 1 millisecond. Each pixel is coupled to a digital memory 110. Digital memory integrates the instantaneous information received from the pixels.

Current frame times are preferably either 33 milliseconds for a 30-frame per second system, or 16 milliseconds for high motion resolution of 60 milliseconds.

In addition to the other advantages noted above, this architecture allows pixel capacitance to be reduced and pixel gain to be increased, since the pixel need provide only instantaneous values, and does not need to integrate the incoming charge.

The signal integration process is divided into two parts: an analog part in the active pixel sensor 100 and a digital part in digital random access memory.

Figure 2:
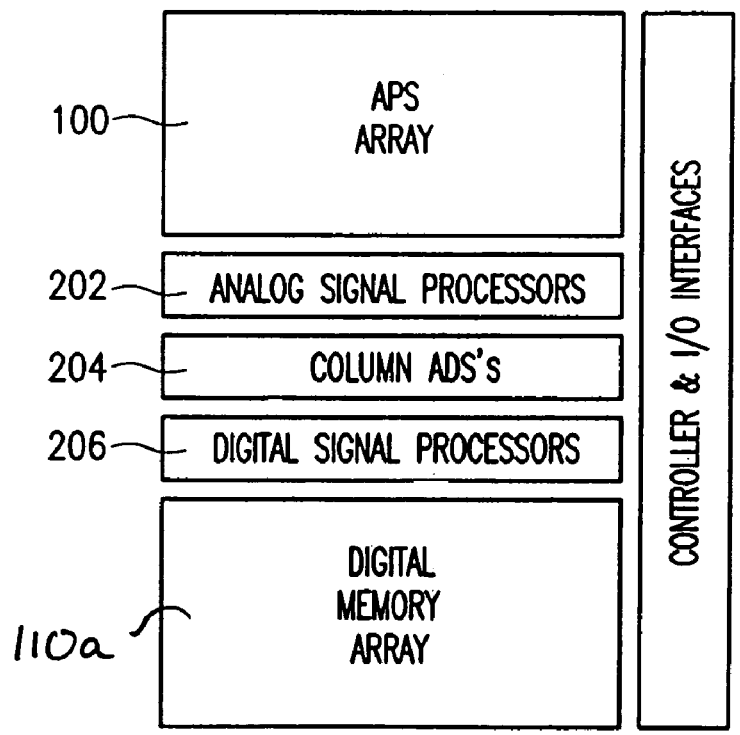
FIGS. 2 and 3 respectively show more detailed block diagrams of the circuitry.

A first embodiment is shown in FIG. 2. FIG. 2 shows the active pixel sensor array 100, coupled with an analog signal processor 202, column A/D converters 204, and a digital signal processor 206. The analog signal processor 202 includes column analog double sampling circuitry both signal and reference to decrease the pixel fixed pattern noise. Preamplifiers, with adjustable gains, can also be used to increase the sensitivity and provide an automatic exposure control, as is known in the art.

The system as described herein uses column parallel A/D conversion, where one separate A/D converter is provided for each column of the active pixel sensor array. In this system, digital integration may be used for oversampling the A/D converter. Digital sampling can reduce the quantization noise density, and hence increase the effective resolution of the system proportionally to arise of the frame bit. Preferably the system operates with an AC input noise of about half of the least significant bit.

Figure 3:
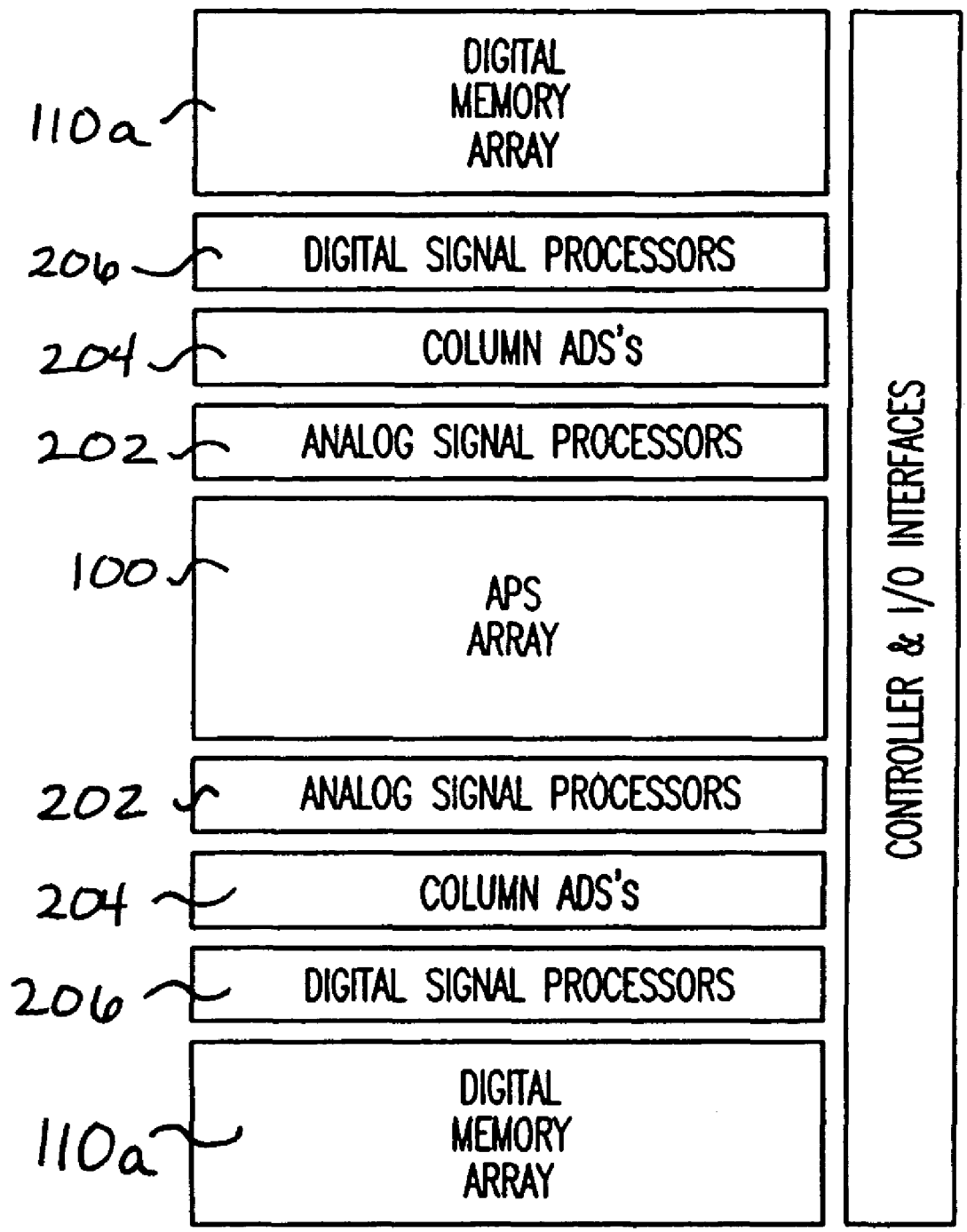

The digital signal processor 206 provides arithmetic operations such as addition, subtraction, division, and multiplication, and also includes a buffer memory to maintain intermediate results. DSP 206 can also act to digitally correct column digital fixed pattern noise. FIG. 3 shows a system similar to that in FIG. 2 but with twice as many digital arrays and processing circuits.

In operation, the sensor is preferably a CMOS image sensor that is of a sufficiently small size that it cannot integrate for a desired frame period. The information from the sensor is sampled by the column A/D converters at an oversampled rate. Each sample is stored in the digital memory array, and the values are integrated in that memory. A digitally integrated value can be subsequently read from the digital memory array.

Although only a few embodiments have been disclosed in detail above, other modifications are possible in the preferred embodiment.

What is claimed is:

1. A processing system comprising:
an array of active pixels of a CMOS image sensor disposed on a substrate;
a first analog signal processor for processing analog signals received from a first plurality of pixels in the array of pixels during a period of time when the plurality of pixels are exposed to an image, wherein said first plurality of pixels generates charge during said period, the first plurality of pixels is sampled multiple times during the period, and during each of the multiple times of sampling a plurality of analog signals is produced, said first analog signal processor providing each of said plurality of analog signals as processed analog signals;
a first circuit coupled to the first analog signal processor for converting each of said processed analog signals to digital signals;
a first digital signal processor coupled to the first circuit for receiving and processing said digital signals; and
a first digital memory coupled to the first digital signal processor for storing said digital signals,
wherein said digital signals are processed by said processing system to produce a plurality of processed digital signals which represents a combination of the multiple times of sampling of the first plurality of pixels during the period of time.

2. The processing system of claim 1, wherein the first circuit for converting said processed analog signals is an oversampling converter.

3. The processing system of claim 1, wherein said analog signal processor comprises column analog double sampling circuitry, wherein said column analog double sampling circuitry samples a pixel signal and a reference signal from a pixel.

4. The processing system of claim 1, further comprising:
a second analog processor for processing analog signals generated by a second plurality of pixels in the array during the period of time; and
a second circuit for converting said processed analog signals from said second analog signal processor to digital signals.

5. The processing system of claim 4, wherein said first and second analog signal processors are respectively located on first and second sides of the array of pixels.

6. The processing system of claim 1, wherein each pixel of said first plurality of pixels is sufficiently small so that it lacks sufficient capacity to integrate incoming photons for an entirety of said period.

7. The processing system of claim 1, wherein said first analog signal processor comprises at least one preamplifier with adjustable gain.

8. The processing system of claim 1, wherein the combination is a summation of the multiple times of sampling of the plurality of pixels.

9. A method of operating an imager comprising:
capturing an image with a pixel sensor array during a period in which pixels in the array are exposed to the image and generate charge;
causing said pixels in the array to each produce electrical signals representing said image;
sampling said electrical signals for each pixel multiple times during said period;
converting, after every sampling of said electrical signals for each pixel, to digital signals; and
processing said digital signals for each pixel and storing a plurality of processed digital signals, said plurality of processed digital signals representing a digital integration of the image during said period.

10. The method of claim 9, further comprising sampling reference signals for each pixel multiple times during the period.

11. The method of claim 9, wherein the sampling of said electrical signals for each pixel multiple times provides successive, instantaneous values for each pixel.

12. The method of claim 11, wherein the converting comprises column parallel analog to digital conversion.

13. The method of claim 9, wherein the processing comprises summing the digital signals.

14. The method of claim 9, wherein each respective pixel value of the plurality of processed digital signals represents a digital integration of a respective pixel of the array during the period.

15. A system comprising:
an active pixel image sensor array;
at least one circuit coupled to the array for sampling and converting analog information from a plurality of pixels in said array to digital values;
at least one digital memory and at least one processor, coupled to the circuit, for storing and combining said digital values into a single frame, wherein said plurality of pixels in said active pixel image sensor array are sampled multiple times during a single, continuous exposure of the array to an image, and sampled values are stored and combined into a single frame in said at least one digital memory, said single frame representing an integrated signal corresponding to the image during said exposure; and
a control sub-system for controlling the sampling of analog information from said pixels and said storage of digital values in said at least one digital memory.

16. The imager circuit of claim 15, further comprising at least one analog signal processor electrically connected to receive said analog information from said image sensor array and to provide said information to a column parallel analog to digital converter.

17. The imager circuit of claim 16, wherein said at least one analog signal processor comprises column analog double sampling circuitry.

18. The imager circuit of claim 16, wherein said at least one analog signal processor comprises first and second analog signal processors.

19. The imager circuit of claim 18, wherein said first and second analog signal processors are respectively located on first and second opposite sides of said image sensor array.

20. A processing system comprising:
an array of pixels disposed on a substrate;
a first column double sampling circuitry for processing a plurality of analog signals received from a first pixel in the array of pixels during a single, continuous exposure of the array to an image, wherein the first pixel is sampled multiple times during the exposure and during each sampling one of the plurality of analog signals is produced;
a first converter for converting analog signals of said first column double sampling circuitry to digital signals;
a first digital signal processor coupled to the first converter for receiving and processing said digital signals; and
a first digital memory coupled to the first digital signal processor for storing said digital signals,
wherein said digital signals stored in said first digital memory are processed by said processing system to generate a frame corresponding to the image during the exposure, the frame representing a plurality of samples of the array of pixels during the exposure.

21. The system of claim 20, wherein two of the multiple samples of the array of pixels sample instantaneous, successive information from the pixels.

* * * * *

UNITED STATES PATENT AND TRADEMARK OFFICE
CERTIFICATE OF CORRECTION

PATENT NO. : 7,956,912 B2  
APPLICATION NO. : 11/529634  
DATED : June 7, 2011  
INVENTOR(S) : Vladimir Berezin Page 1 of 1

It is certified that error appears in the above-identified patent and that said Letters Patent is hereby corrected as shown below:

In column 3, line 12, in Claim 4, after "analog" insert -- signal --.

Signed and Sealed this  
Ninth Day of August, 2011

David J. Kappos  
*Director of the United States Patent and Trademark Office*